(12) United States Patent
Kintis

(10) Patent No.: US 7,876,855 B2
(45) Date of Patent: Jan. 25, 2011

(54) PHASE MODULATION POWER SPREADING USED TO REDUCE RF OR MICROWAVE TRANSMITTER OUTPUT POWER SPUR LEVELS

(75) Inventor: Mark Kintis, Manhattan Beach, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 639 days.

(21) Appl. No.: 09/941,371

(22) Filed: Aug. 28, 2001

(65) Prior Publication Data

US 2003/0043933 A1  Mar. 6, 2003

(51) Int. Cl.
*H04L 27/20* (2006.01)
(52) U.S. Cl. ........................ 375/308; 455/209
(58) Field of Classification Search ............ 375/308, 375/260, 261, 296; 455/209
See application file for complete search history.

(56) References Cited

U.S. PATENT DOCUMENTS

| 3,432,758 A * | 3/1969 | Jacques et al. ........... 455/258 |
|---|---|---|
| 3,755,741 A * | 8/1973 | Stover .................... 455/226.1 |
| 4,641,369 A | 2/1987 | Grote et al. |
| 4,661,897 A * | 4/1987 | Pitel ....................... 363/71 |
| 4,841,169 A | 6/1989 | Tsironis et al. |
| 5,166,634 A * | 11/1992 | Narahashi et al. ........ 330/151 |
| 5,428,838 A | 6/1995 | Chang et al. |
| 5,784,403 A * | 7/1998 | Scott ..................... 375/151 |
| 5,794,131 A | 8/1998 | Cairns et al. |
| 5,903,555 A | 5/1999 | Wildauer et al. |
| 5,978,420 A * | 11/1999 | Koslov et al. ............ 375/295 |
| 6,054,889 A | 4/2000 | Kobayashi et al. |
| 6,078,802 A | 6/2000 | Kobayashi et al. |
| 6,101,225 A * | 8/2000 | Thorson .................. 375/308 |
| 6,133,791 A * | 10/2000 | Horiguchi et al. ........ 330/151 |
| 6,144,236 A | 11/2000 | Vice et al. |
| 6,549,495 B1 * | 4/2003 | Spruit et al. ............ 369/47.19 |
| 6,754,287 B2 * | 6/2004 | Underbrink et al. ...... 375/308 |
| 2004/0202235 A1 * | 10/2004 | Kohli et al. ............. 375/150 |

OTHER PUBLICATIONS

"Effects of Offsets on Bipolar Integrated Circuit Mixer Even-Order Distortion Terms", by Coffing, et al., *IEEE Transactions on Microwave Theory and Techniques*, vol. 49, No. 1, Jan. 2001, pp. 23-30.

(Continued)

*Primary Examiner*—David C Payne
*Assistant Examiner*—Leon-Viet Q Nguyen
(74) *Attorney, Agent, or Firm*—John S. Paniaguas; Katten Muchin Rosenman LLP

(57) ABSTRACT

A two stage mixer is configured to reduce the power levels of out of band spurious output signals or spurs, such as the leakage from the second stage mixer by way of phase modulation power spreading. The local oscillator signal applied to first mixer stage is phase modulated while the local oscillator signal applied to the second mixer stage is inverse modulated. As such, a problematic spur, such as leakage from the local oscillator applied to the second mixer stage is spread so that the power levels of the spur are distributed a wider bandwidth instead of concentrating the power levels at single frequencies, thus reducing the power level at any single frequency. By utilizing phase modulation, the need for relatively complex and expensive filters is eliminated.

15 Claims, 2 Drawing Sheets

OTHER PUBLICATIONS

"An Actively Balanced GaAs HBT-Schottky Mixer for 3-V Wireless Applications", by Kobayashi, et al., *IEEE Microwave and Guided Wave Letters*, vol. 7, No. 7, Jul. 1997, pp. 181-183.

"An 18-22-GHz Down-Converter Based on GaAs/AlGaAs HBT-Schottky Diode Integrated Technology", by Kobayashi, et al., *EEE Microwave and Guided Wave Letters*, vol. 7, No. 4, Apr. 1997, pp. 106-108.

*Microwaves and Wireless Simplified*, by T.S. Laverghetta, Artech House 1998, pp. 90-92.

* cited by examiner

PHASE MODULATION POWER SPREADING USED TO REDUCE RF OR MICROWAVE TRANSMITTER OUTPUT POWER SPUR LEVELS

CROSS-REFERENCE TO RELATED APPLICATIONS

The present application is related to commonly-owned copending patent application entitled; "Low Order Spur Cancellation Mixer Topologies," by Mark Kintis, application Ser. No. 09/941,403, filed on Aug. 28, 2001, hereby incorporated by reference.

BACKGROUND OF THE INVENTION

1. Field of the Invention

The present invention relates to RF and microwave mixers and more particularly to mixers for up-converting RF and microwave signals which incorporates phase modulation power spreading to reduce the power level of spurious output signals (also known as spurs).

2. Description of the Prior Art

Mixers are generally known in the art and are used in various applications for up-converting or downconverting microwave and RF signals having a frequency $f_1$ to a higher or lower frequency for by way of a local oscillator. Such mixers are non-linear devices with two input ports and one output port. One input port is used for a microwave or RF input signal having a frequency $f_1$ while the other input port is for a local oscillator signal having a frequency $f_2$. When such signals are applied to the input ports, the following signals are generated at the output port: the original signals $f_1$, $f_2$; the sum and difference of the signals $f_1$ and $f_2$; harmonics of the original signals; as well as the sum and differences of each of the harmonics of the signals $f_1$ and $f_2$. In general, the output signals available at the output of a mixer are provided by equation 1 below:

$$f_{output} = \pm M^* f_1 \pm N^* f_2, \quad (1)$$

where M and N are integers and the sum |M|+|N|="order" of the mixer output signal frequency.

When the mixer is used as an upconverter, the desired output frequency of the mixer may be $f_1+f_2$ or $f_2-f_1$, for example. Similarly, when the mixer is used as a downconverter, the desired output of the mixer may be $f_1-f_2$ or $f_2-f_1$. The balance of the signals generated by the mixer are spurious output signals or simply spurs. Such spurs are well known and relate to the inherent characteristics of the mixers, for example, as disclosed in "Effects of Offsets on Bipolar Integrated Circuit Mixer Even-Order Distortion Terms", by Coffing et al., *IEEE TRANSACTIONS ON MICROWAVE THEORY AND TECHNIQUES*, vol. 49, no. 1, January 2001, pages 23-30.

The spurs at the mixer output port can often times be filtered out with simple low pass or band pass filters. Because of this, the power level of many of the spurs decreases the further the spur frequency is away from the desired output frequency. Thus, due to the low power level, many of the spurs are simply ignored.

The Federal Communication Commission requires that the out of band spurious signals be below a given power level within a given bandwidth for transmitters. One typical requirement for satellite downlinks is that the signals must not exceed 65 dBc within any 4 KHz frequency bandwidth window. Unfortunately, in certain applications this requirement is difficult if not impossible to meet.

FIG. 1 illustrates a typical upconversion example used for a transmitter 20. The transmitter 20 includes two mixer stages, generally identified with the reference numerals 22 and 24. Each mixer stage 22 and 24 includes two input ports and one output port. In this example, a 750 MHz RF input signal, identified with the reference numeral 26, is applied to an input port of the first mixer stage 22. The 750 MHz input signal 26 is to be upconverted to 18.25 GHz. As such, the local oscillator signals for the two mixer stages 22 and 24 are selected as 3 GHz and 16 GHz, respectively.

One output signal of the first mixer stage is 2.25 GHz plus a number of spurious output signal or spurs as discussed above. Some of the spurs are filtered out by a simple intermediate frequency (IF) filter, such as the IF filter 28. The output of the IF filter 28 is applied to the input port of the second mixer stage 24. The output of second mixer stage 24 is typically applied to a power amplifier and subsequently to a transmit antenna (not shown).

Unfortunately, each of the mixer stages 22, 24 produces spurs with significant power levels that can appear in the transmitted output. More particularly, the spurious output signals or spurs from both the first and second mixer stages 22 and 24 are generally significant because of a relatively high power local oscillator signal is required to achieve RF frequency conversion. Typically, the power requirement for the local oscillator signal is at least 20 dB higher than the incoming RF signals. Unfortunately, the relatively high power level spurs produced from the first mixer stage 22 are mixed with the relatively high power level of the local oscillator signals at the second mixer stage 24. Consequently, in addition to the 18.25 GHz desired output signal, relatively high power level spurs are also generated which exceed the 65 dBc power level requirement. Referring to FIG. 2, a relatively high power level spur is generated, identified with the reference numeral 32. This spur 32 represents the leakage from the second mixer stage 24. As shown in FIG. 2, the spur 32 exceeds the 65 dBc requirement. The 65 dBc reference level is identified with the segments 38 and 40. Thus, in order to meet the FCC requirement, a narrow band output filter is required to filter out the spur 32. Such an output filter would be relatively expensive and possibly degrade the transmitter in band performance. As such, there is a need for a mixer configuration, which would reduce the power level of the spur signal resulting from leakage of the local oscillator in the second mixer stage of a transmitter to within acceptable limits.

SUMMARY OF THE INVENTION

Briefly, the present invention relates to a mixer, for example, a two stage mixer, for use in a transmitter application. In order to reduce the power level of out of band spurious output signals or spurs, phase modulation power spreading is used. In particular, each mixer is phase modulated or inverse phase modulated, for example, by a direct sequence phase shift keying (BSK) modulator, to spread the power levels of the spurs over a wider bandwidth instead of concentrating the power levels at single frequencies. The system is easily implemented by phase modulating the first mixer stage with a first psuedorandom number (PN) code and inverse phase modulating the second mixer stage with the same PN code. By utilizing phase modulation, the need for relatively complex and expensive second and third order filters is eliminated to reduce the power level of spurs, such as those spurs resulting from the leakage of the local oscillator in the second mixer stage.

DESCRIPTION OF THE DRAWINGS

These and other advantages of the present invention are readily understood with reference to the following specification and attached drawings wherein.

DETAILED DESCRIPTION

The present invention relates to a two stage mixer for use in a transmitter. In accordance with the present invention, in order to reduce the power levels of the spurs, the power levels of the spurs are spread out over a relatively wide bandwidth. As will be discussed in more detail below, spreading the power level of the spurs over relatively wide bandwidth reduces the power levels of the spurs, for example, in 4 KHz frequency bandwidth windows without the need for relatively complex and expensive second and third order filters. Even though the power levels of some of the spurs are relatively high, due to the relatively high power level of the local oscillator signal in the mixer stages, these power levels are no longer concentrated at single frequencies but are spread over a relatively wider bandwidth reducing the power level in narrower bandwidth windows.

Figure 3:
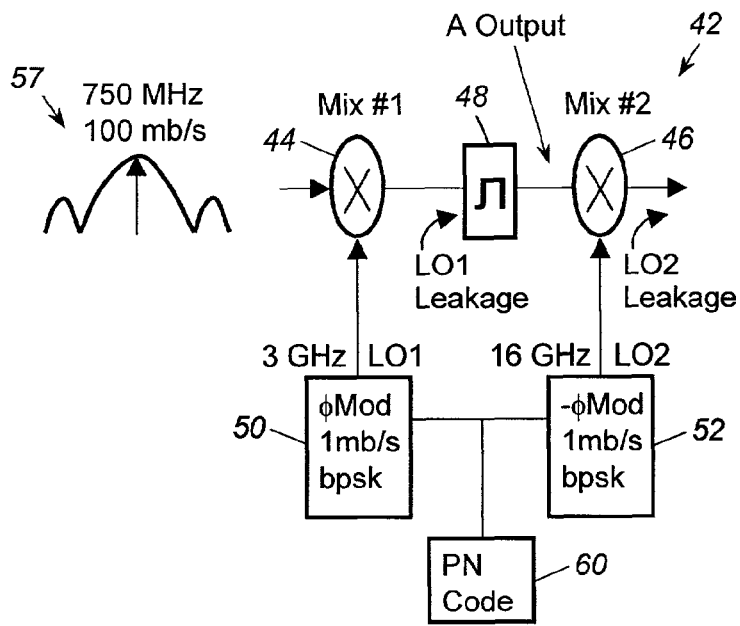
FIG. 3 is a block diagram of two stage mixer in accordance with the present invention.

Referring to FIG. 3, a two-stage mixer in accordance with the present invention, generally identified with the reference numeral 42, is illustrated. In accordance with the present invention, the power level of the resulting spurs is spread over relatively wide bandwidth using phase modulation. More particularly, as shown, the two-stage mixer 42 includes a first mixer stage 44 and second mixer stage 46. An intermediate frequency (IF) filter 48 may be disposed between the first mixer stages 44 and the second mixer stage 46. In this example, a 750 MHz input RF signal is to be converted to an 18.25 GHz output signal for transmission. Although, not shown, the output of the second mixer stage 46 may be connected to another filter stage an amplifier stage, as well as a transmit antenna to transmit an output signal with a center frequency at 18.25 GHz. As such, the frequency of the local oscillators for the first mixer stage 44 and the second mixer stage 46 are selected as 3 GHz and 16 GHz respectively, as in the previous example.

Figure 1:
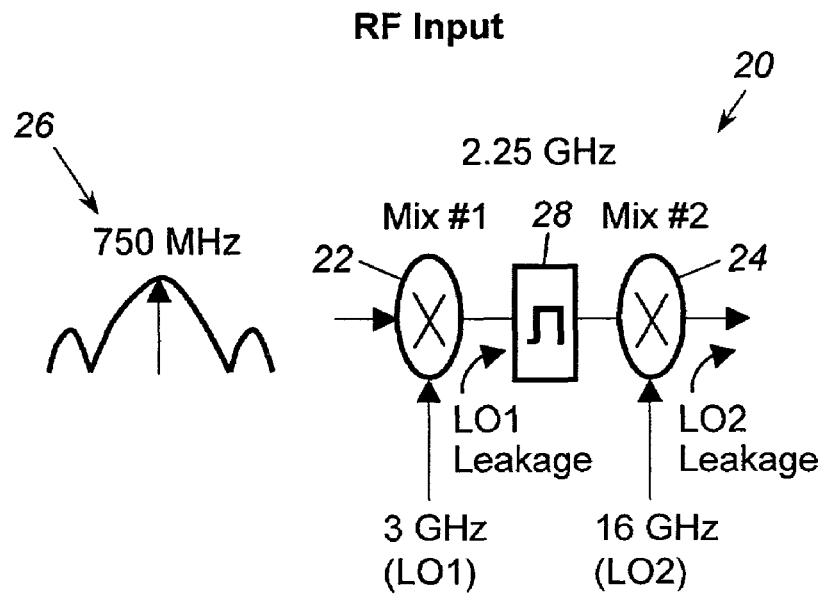
FIG. 1 is a block diagram of a known two stage mixer, shown with a 750 MHz input signal.
Figure 2:
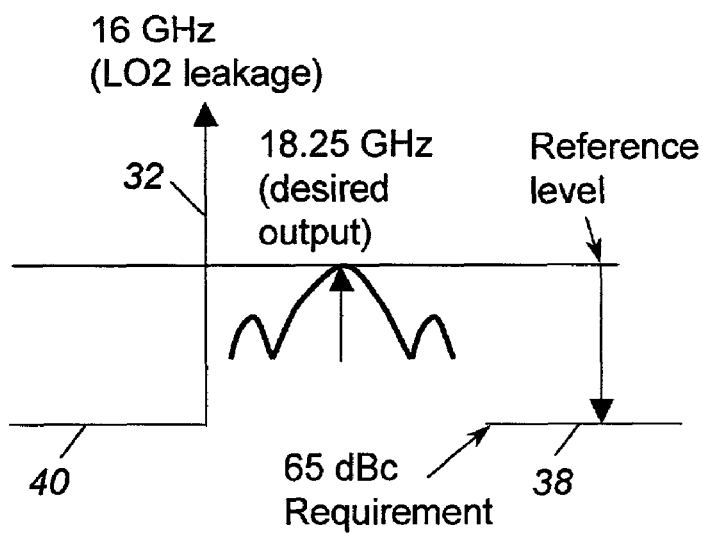
FIG. 2 is a graphical illustration of the signal power levels as a function of frequency of the desired output signal and the spurious output signal from the local oscillator in the second mixer stage for the mixer illustrated in FIG. 1.

In accordance with an important aspect of the invention, the local oscillator signals are phase modulated by a phase modulator 50. The phase modulator 50 may be, for example, a direct sequency binary phase shift key (BPSK) modulator, modulated with a psuedorandom number (PN) code. The phase modulated output signals from the first mixer stage 44 are applied to the IF filter 48, which may be a simple low pass or bandpass filter which filters out various high order spurs. One of the aspects of the invention is that the phase modulation of the first mixer stage 44 for a given frequency bandwidth window spreads the power level of undesired spurs that cannot be easily filtered out. For example, the relatively high power level spur at 16 GHz resulting from leakage of the local oscillator in the second mixer stage 46 is no longer concentrated at a single frequency or tone as in the example illustrated in FIG. 2. Rather, the power level is spread out over a relatively wide bandwidth, shown as 2 MHz.

In general, the power reduction is provided by Equation (2) below:

10 log (phase modulation rate/bandwidth window)

Figure 4:
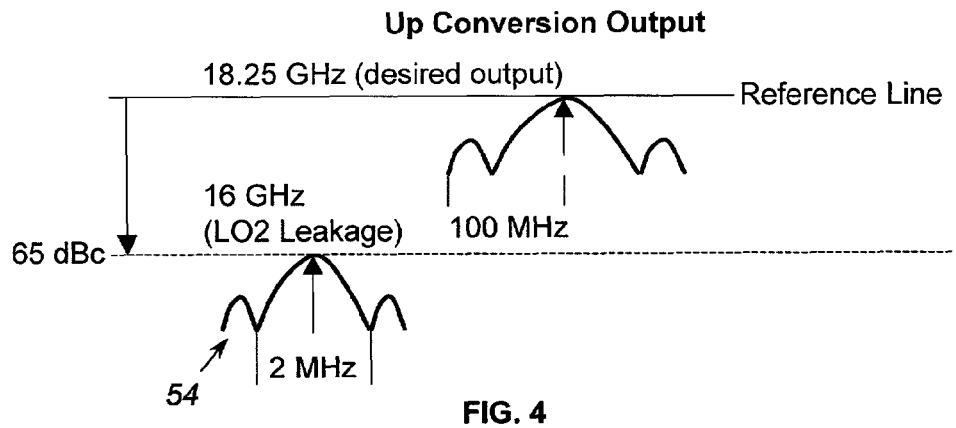
FIG. 4 is a graphical illustration of the signal power levels as a function of frequency of the desired output signal and the spurious output signal from the local oscillator in the second mixer stage for the two stage mixer illustrated in FIG. 3.

Thus, for a 1 MHz phase modulation rate relative to a 4 KHz frequency bandwidth window, the power is reduced to 10 log 1 MHz/4 KHz or 24 dB. Thus, as shown in FIG. 4, the spur 54 at the local oscillator frequency of 16 GHz for the second mixer stage is reduced to an acceptable level, for example, less than 65 dBc.

Although the spur 54 resulting from leakage of the local oscillator of the second mixer stage is the most problematic, the power levels of other spurs are also reduced. For example, with reference to FIG. 5, the spur 55 at 3.0 GHz resulting from leakage of the local oscillator in the first mixer stage 44, is spread over a relatively wide bandwidth, for example, 2 MHz, to an acceptable level, for example, less than 65 dBc.

With reference to FIG. 3, a 750 MHz input signal, generally identified with the reference numeral 57, is mixed with the output of the phase modulator 50 and applied to a filter 48. The output of the filter 48, thus includes the desired frequency of 2.25 MHz as well as reduced power spurs, such as the spur at the local oscillator frequency of 3.0 GHz from the first mixer stage 44. These signals, in turn, are mixed in the second mixer stage 46. In order to remove the phase modulation from the signal, the local oscillator signal for the second mixer stage 46 is inverse phase modulated by an inverse phase modulator, for example, a BPSK modulator 52. The inverse phase modulator 52 is phase modulated using the same PN code as the phase modulator 50 for the first mixer stage 44. The phase modulator 50 and inverse phase modulator 52 may be synchronized by using the same phase modulator source for both of the local oscillators for the first and second mixer stages 44 and 46, respectively.

The output of the second mixer stage 46 generates the desired output signal at 18.25 GHz, while minimizing the power levels of the spurs within 4 KHz frequency bandwidth windows. In particular, the output frequency $F_{out}$ of the second mixer stage 46 is given by Equation (3) below:

$$F_{out} = IF_1 + LO_2, \quad (3)$$

where $IF_1$ is the output frequency of the IF filter 48 and $LO_2$ is the frequency of the second stage local oscillator.

The output frequency of the IF filter 48 is given by Equation (4).

$$IF_1 = LO_1 - F_{in}, \quad (4)$$

where $LO_1$ is the frequency of the first stage mixer 44 and $F_{in}$ is the frequency of the input signal 57.

By substituting Equation (4) into Equation (3), the output frequency $F_{out}$ is given by Equation (5) below.

$$F_{out} = LO_1 - F_{in} + LO_2 \quad (5)$$

If the $LO_1$ signal, is phase modulated while the $LO_2$ signal is inverse phase modulated, the relative phase shifts are canceled and thus do not appear in the output signal $F_{out}$. However, the leakage from the oscillator for the second stage 46 is inverse phase modulated and thus is spread out as shown in FIG. 4, thus reducing its energy in a 4 KHz bandwidth window. For example, with reference to FIG. 4, the spur at 16 GHz which represents leakage from the oscillator of the second mixer 46 is illustrated. This spur, identified with the reference numeral 54 is the result of the relatively high power level local oscillator signal used for the second mixer stage 46. As shown, due to the phase modulation, the power level of the spur 54 is are spread over a relatively wide frequency bandwidth, thereby reducing the power level at individual frequencies or tones. Consequently, the power level of the spur 54 is within acceptable limits.

Other spurs, however, are not spread, and thus collapse to a single spectral line, for example, the spur signal resulting from the addition of the local oscillator frequency (LO$_1$) of the first mixer stage 44 with the local oscillator frequency (LO$_2$) of the second mixer stage 46. In particular, the LO$_1$ frequency is phase modulated by the phase modulator 50 while the LO$_2$ frequency is inverse phase modulated by the inverse phase modulator 52. Thus, the spur LO$_1$+LO$_2$ is not spread but collapses to a single spectral line. However, this spur is less of a problem than the LO$_2$ leakage because it can be controlled by filtering the input to the second mixer stage 46 to remove the LO$_1$ leakage. Filtering out the LO$_1$ leakage at the input of the second mixer stage 46, designated as point A (FIG. 3), is easier than filtering the output of the second mixer stage 46 for several reasons. Firstly, the frequency at point A is lower than the frequency at the output of the second mixer stage. Secondly, the rejection shape factor at point A is greater at point A than at the output of the second mixer stage as shown below in Equation (6).

as opposed to $$\frac{3 \text{ GHz(spur)}}{2.25 \text{ GHz(desired)}} = 1.33$$

Various phase modulators are suitable for a phase modulator 50 and the inverse $$\frac{18.25 \text{ GHz(spur)}}{16.0 \text{ GHz(desired)}} = 1.14$$

phase modulator 52. The phase modulator 50 may be the same as the inverse phase modulator 52 but driven with an inverted bit sequence (0=1, 1=0). The PN code generator 60 generates the PN codes. The phase modulator 50, inverse phase modulator 52 as well as a PN code generator are all well documented in the literature.

Although the invention has been described in terms of BPSK, the principles of the present invention are also applicable to other higher phase modulation techniques, such as quaternary phase shift keying (QPSK), phase shift (PSK). "M-ary" phase modulation techniques, such as minimum phase shift keying (MPSK), for example, as described in "Digital Communications", second edition, Prentice Hall, Copyright 2001, hereby incorporated by reference. The principles of the present invention are also applicable to other modulator techniques, all well known in the art, such as Gaussian filtered minimum shift keying (GMSK), for example, as disclosed in U.S. Pat. Nos. 5,022,054; 5,090,026; 5,117,441; 5,144,256; and 5,848,105, all hereby incorporated by reference. M-ary modulation systems are disclosed, for example, in U.S. Pat. Nos. 5,712,871; 5,781,130; 6,002,725; 5,471,207; 5,390,198; 5,155,471; 4,989,220; 4,881,246, all hereby incorporated by reference. BPSK modulation systems are disclosed in U.S. Pat. Nos. 5,502,745; 5,455,544; 5,455,543; 5,347,228; 4,816,769; 4,491,805, all hereby incorporated by reference. QPSK modulation systems are disclosed in U.S. Pat. Nos. 4,555,667; 4,612,518; 4,769,816; 4,773,083; 5,084,903; 5,960,029; 6,091,781, all hereby incorporated by reference. It is only necessary that the first mixer stage be modulated while the second mixer stage is inverse modulated in order to take advantage of the principles of the present invention.

Figure 5:
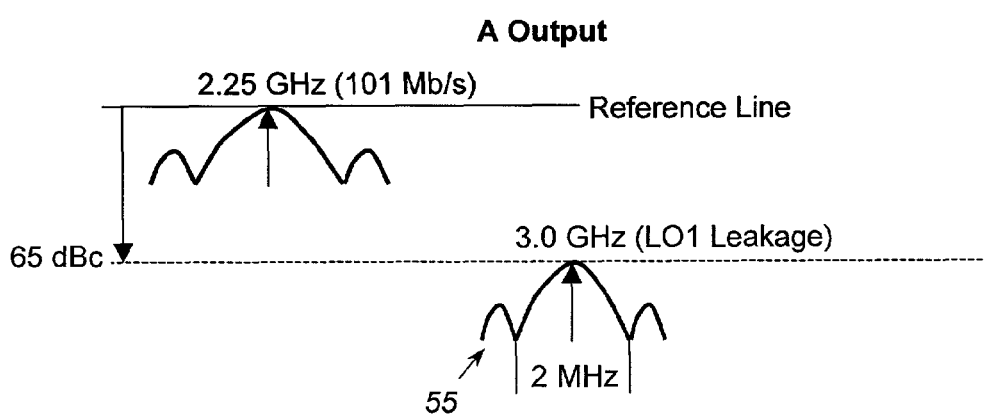
FIG. 5 is a graphical illustration of the signal power levels as a function of frequency of the desired output signal and the spurious output signal resulting from the leakage from the local oscillator in the second mixer stage, applied to the input of the second mixer stage of the mixer illustrated in FIG. 3.

The principles of the present invention have also been described and illustrated in terms of a two-stage mixer. However, as illustrated in FIG. 5, the principles of the present invention can also be used to spread the power levels of unwanted spurs in a one stage mixer. For example, this could be accomplished by applying the inverse phase modulation directly to the modulation source. As such, when mixed with the local oscillator signal and its phase modulation, it is removed in the mixing process for the desired signal.

Obviously, many modification and variations of the present invention are possible in light of the above teachings. For example, thus, it is to be understood that, within the scope of the appended claims, the invention may be practiced otherwise than as specifically described above.

I claim:

1. A mixer circuit for reducing the power level of spurious output signals, the mixer comprising:

a first mixer stage which includes a first mixer with first and second input ports and a first output port, said first input port for receiving an input signal and mixing said input signal with a modulated first local oscillator signal to generate a first output signal having a first frequency and spurious output signals at frequencies other than said first frequency;

a second mixer stage which includes a second mixer with third and fourth input ports and a second output port, said first output port of said first mixer electrically coupled to said third input port of said second mixer for mixing said first output signal from said first mixer with a modulated second local oscillator signal and generating a second output signal at a second frequency and spurious output signals at frequencies other than said first frequency and said second frequency;

a phase modulator for phase modulating a first local oscillator signal, modulated by a pseudorandom number defining said modulated first oscillator signal, said phase modulator electrically coupled to said second input port of said first mixer; and an inverse phase modulator for inverse phase modulating a second local oscillator signal, modulated by the same pseudorandom number defining said modulated second oscillator signal, said inverse phase modulator electrically coupled to said fourth input port of said second mixer to produce an output signal at said second output port with reduced spurious signals.

2. The mixer circuit as recited in claim 1, wherein said phase modulator is a phase shift keying (PSK) modulator.

3. The mixer circuit as recited in claim 2, wherein said inverse phase modulator is a phase shift keying (PSK) modulator.

4. The mixer circuit as recited in claim 2, wherein said phase modulator is a first direct sequence binary phase shift keying (BPSK) modulator modulated according to a pseudorandom number (PN) code and said mixer circuit includes a PN code generator for generating said PN code.

5. The mixer circuit as recited in claim 4, wherein said inverse phase modulator is a second direct sequence binary phase shift keying modulator modulated according to said PN code.

6. The mixer circuit as recited in claim 1, further including an intermediate filter coupled between said first output port and one of said third and fourth input ports.

7. The mixer as recited in claim 1, wherein said modulator and said inverse modulator are configured for QPSK modulation.

8. The mixer as recited in claim 1, wherein said modulator and said inverse modulator are configured for PSK modulation.

9. The mixer as recited in claim 1, wherein said modulator and said inverse modulator are configured for M-ary modulation techniques.

10. The mixer as recited in claim 1, wherein said modulator and said inverse modulator are configured for GMSK modulation techniques.

11. A method of reducing the power levels of spurious output signals at the output of a mixer circuit comprising the steps of:
 (a) providing a two stage mixer including a first mixer and a second mixer, said first mixer and said second mixer each having a local oscillator port, an input port for receiving first and second local oscillator signals and an output port;
 (b) providing a first local oscillator signal and a second local oscillator signal;
 (c) phase modulating said first local oscillator signal with a pseudorandom number defining a modulated first oscillator signal and applying said modulated first local oscillator signal to said local oscillator port of said first mixer;
 (d) inverse phase modulating said second local oscillator signal defining a modulated second oscillator signal and applying said modulated second local oscillator signal to said local oscillator port of said second mixer with the same pseudorandom number used in step (c); and
 (e) connecting said output port of said first mixer to said input port of said second mixer.

12. The method as recited in claim 11, wherein modulating and inverse modulating in steps (b) and (c) are accomplished by BPSK modulation techniques.

13. The method as recited in claim 11, wherein modulating and inverse modulating in steps (b) and (c) are accomplished by QPSK modulation techniques.

14. The method as recited in claim 11, wherein modulating and inverse modulating in steps (b) and (c) are accomplished by GMSK modulation techniques.

15. The method as recited in claim 11, wherein modulating and inverse modulating in steps (b) and (c) are accomplished by M-ary modulation techniques.

* * * * *